Oct. 27, 1931.  A. R. HAUBER  1,828,931
CONVERTIBLE VEHICLE SEAT
Filed May 16, 1930  2 Sheets-Sheet 1

Inventor
ALFRED R. HAUBER
By Frank D. Gray
Attorney

Oct. 27, 1931.   A. R. HAUBER   1,828,931
CONVERTIBLE VEHICLE SEAT
Filed May 16, 1930   2 Sheets-Sheet 2
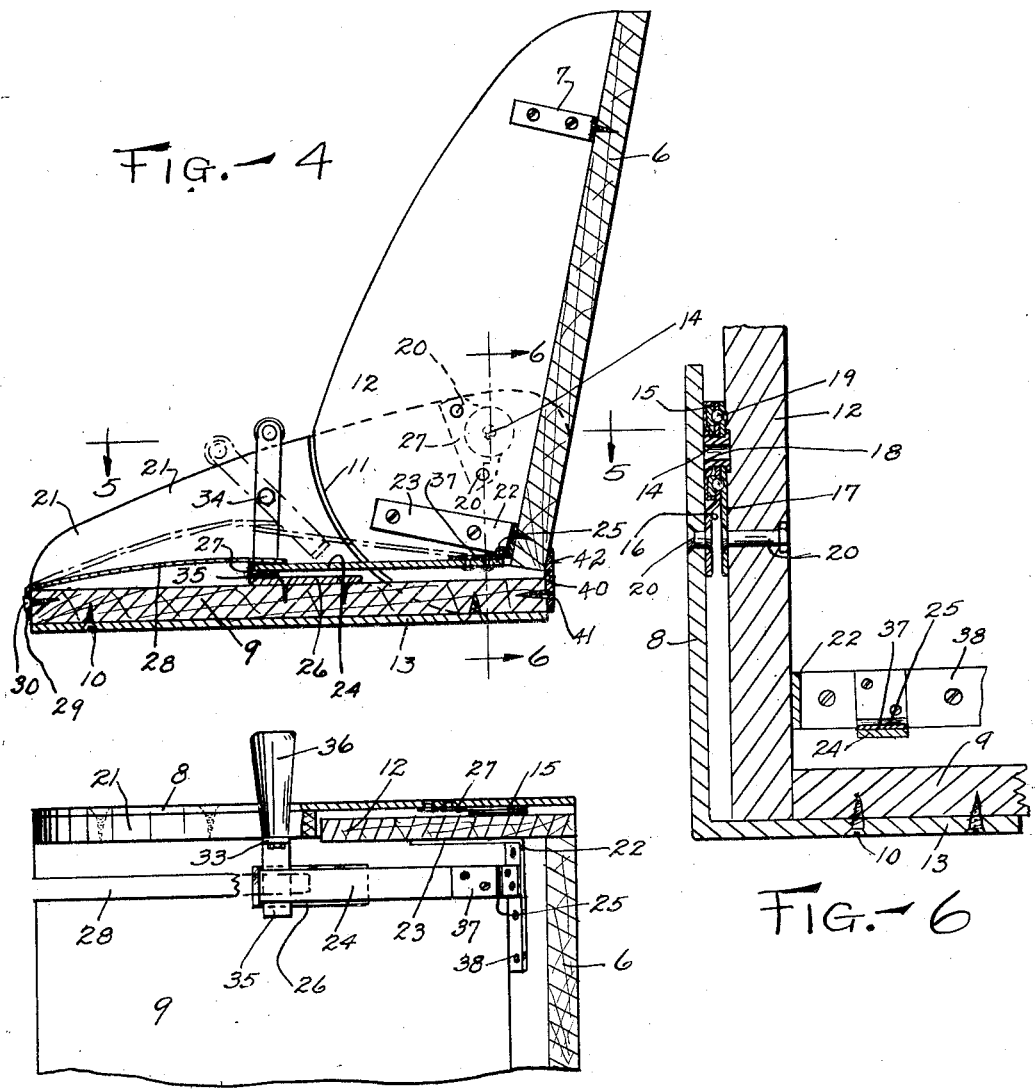
Inventor
ALFRED R. HAUBER
By Frank D. Gray
Attorney Patented Oct. 27, 1931

1,828,931

UNITED STATES PATENT OFFICE

ALFRED R. HAUBER, OF CLEVELAND, OHIO

CONVERTIBLE VEHICLE SEAT

Application filed May 16, 1930. Serial No. 452,836.

My present invention relates to a convertible vehicle seat, and more particularly to convertible automobile seats which are provided with vertical ends when used as convertible seats, but having an improved form of seat ends especially designed to make an adjustment of the seats including the back and end frames, to afford an automobile bed structure with only a limited shifting of the seat.

It is an especial object of my invention to provide the seat ends for the ordinary position adjacent the seat and back when the latter is positioned vertically, the said seat ends being formed of two parts for each, the back part of each end being positively connected with the back portion, whereby the combined back and end section may swing backward upon a pivot which is spaced far above the seat, and thereby tip backward without spacing the sections of the ends very far apart when making the adjustment.

It is a further object of my invention to provide outside of and slightly spaced from the said ends of the seat a thin metal plate to be held in positive vertical position and of about the same general outline of the seat end itself, or slightly lower in height, such plate having a bottom inturned flange fixedly secured to the bottom of the seat. This plate will have the strength and position to hold the pivot means for mounting certain parts as will be fully explained.

A still further object of my invention lies in the provision of a metal bracket having bent portions securely fastened to one section of the seat end and to the lower end of the back, respectively, and having an extended portion hinged to the main portion of the bracket, the opposite end of the extension serving together with an upturned flange on the seat, as a latch to hold the back of the seat in its upper position when it is so desired, a manual lever being pivoted on the said end plate for unlatching the bracket, a thin metal front plate being attached to the seat to protect the latch from contact with seat covering or bedding when the seat back is in either its upper or lower position.

The especial arrangement of the parts above referred to together with related mechanism for actuating the parts will be more readily apparent from the following description and from the drawings, in which,—

Figure 4 is a transverse section of my improved structure taken in the plane indicated by the line 4—4 of Fig. 3;

Figure 5 is a horizontal section of a detail structure taken on the plane indicated by the line 5—5 of Fig. 4, and Figure 6 is a vertical section of a detail structure taken in the plane indicated by the line 6—6 of Fig. 4.

Figure 1:
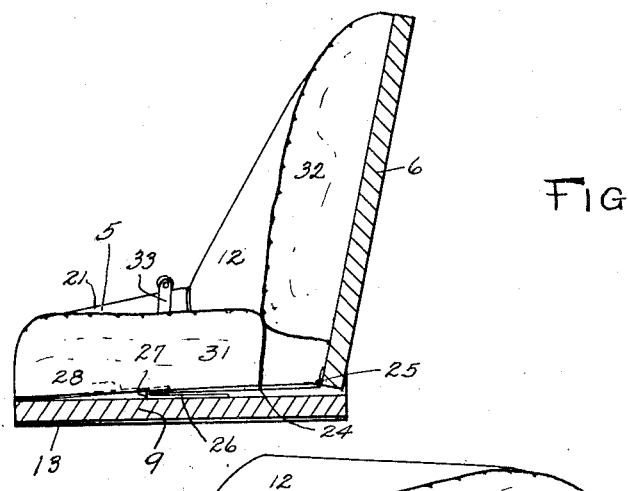
Figure 1 is a transverse section through my improved auto seat and back, adjacent one of the ends.

Referring to the drawings in detail, the numeral 5 designates the front seat of a vehicle, the numeral 6 designating the back rest which is connected to the base of the seat by a more or less particular manner forming the structure of my invention. The end structures of my auto seat are duplicated, a portion of each end frame being fixedly secured to the back 6, as by L-brackets 7 attached to the upper portion of the parts. A very important feature of my invention is the provision at either end of the seat, of a thin metal plate 8 slightly spaced from and of the same general outline as the inner end frames of the seat, and bearing in directly upon the outer surface of the latter, but extending down beneath the seat bottom 9 and bent inwardly to form a flange 13 beneath the bottom 9, and fixedly secured thereto by attaching means such as the screws 10, shown clearly in Figs. 4 and 6. These inner end frames, to be described more fully later, are substantially parallel with the main vertical portion of the outer metal plate 8.

To accomplish the purpose desired by my improvement, each of these inner end frames is divided by an arc of separation 11 into two sections the rear one of which 12 is pivoted near its upper edge at 14 to the plate 8 near its rear end by a suitable bearing mechanism 15, as shown in Fig. 6. This bearing may readily be formed of metal plates 16 and 17 secured to the plate 8 and frame portion 12 respectively, such plates being apertured to receive therein a mounting sleeve 18 and very appropriately provided with ball bearings 19. Suitable bolt fasteners 20 may rigidly secure the plates to the proper parts.

Figure 2:
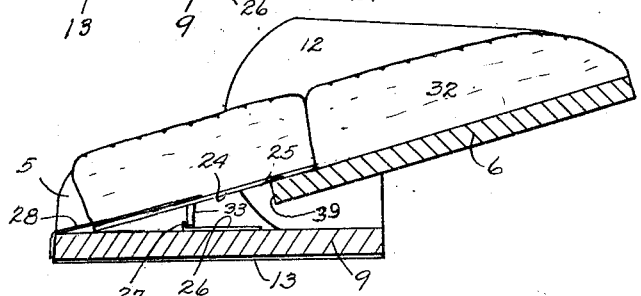
Figure 2 is a view similar to Fig. 1, but showing the back in reclined position.

The position of this bearing 14 near the upper edge of the plate 8, results in a radius for the section 12 that permits the back rest 6 and such section to swing together down to the reclining position shown in Fig. 2, without separating the arc 11 far from the edge of the forward section 21 of the frame which remains permanently attached to the plate 8. As an additional securing means connecting the end section 12 with the back rest 6, I provide a lower L bracket 22 one of whose ends 23 is secured to the section 12, and the other end similarly attached to the lowermost edge of the rest 6 near such section. These brackets 7 and 22 rigidly secure the two end frames to the back rest 6 so that the parts swing together on the pivots 14.

To the lower edge of the end of the bracket 22 secured to the rest 6, is hingedly connected a forwardly extending slender plate 24 whose rear end is pivoted at 25 to the bracket 22 and whose forward end reciprocates along the upper surface of the seat bottom 9, as the back rest swings about the pivots 14. Adjacent the ends of these plates 24 I provide the upper surface of the support 9 with metal plates 26 each of which has a short upturned flange 27 which is designed to receive thereagainst the thrust of the forward end of the plate 24, when the back rest 6 is in its uppermost position. The hinge 25 thereby permits the plate 24 at either end of the seat to drop down against the flange 27, or to rise on its hinge and thereby permit the plate 24 to move forwardly over the flange and thus permit the back rest to swing down as its lower edge swings forward on the pivots 14.

It will thus be seen that the bracket 22 and its hinged plate 24 serve, together with the flange 27 as a latching means to hold the back rest in proper position and to release the same from such position when desired. It is intended to provide means for partially covering the contact ends of the parts 24 and 27 by a rearwardly extending plate 28 whose end extends back over the flange.

The said plate 28 is of thin sheet metal having a forward downwardly turned flange 29 secured as by screws 30 to the forward edge of the seat bottom 9, the rear end of the plates 28 being unattached to any other parts, only the pressure of the cushions 31 serving to hold such plates down upon the flange 27 and the forward end of the latch plate 24. When therefore, it is desired to unlatch the back rest 6 and its attachment for the purpose of swinging the rest into a position bringing the cushion 31 and the back cushions 32 into alinement, means must be provided for releasing the plate 24 which is shown in Figs. 3, 4 and 5 as a hand lever 33 pivoted between its ends at 34, to the end plate 21 the operation of which I shall now describe.

Figure 3:
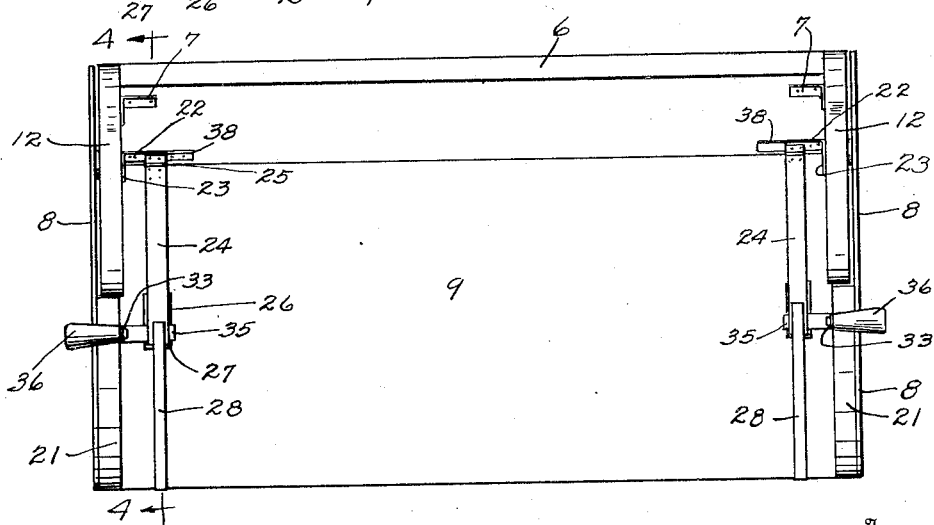
Figure 3 is a plan view of the entire seat showing the parts in vertical position.

The lower end of the lever 33 has an inwardly turned foot portion 35 which extends beneath the front end of the latch plate 24, as shown in Figs. 3, 4 and 5. When the lever 33 swings from the full line position shown in Fig. 4 to the broken line position, the forward end of the plate 24 will be raised above the flange 27, so that it will be free to move forwardly over said flange and permit the back rest 6 to swing backward on its pivots 14. The upper end of the lever 33 is provided with a handle 36 extending outwardly over the upper edge of the plate 8 and of the forward section 21. Such a lever 33 is provided on either end of the seat.

The hinge 25 may often be advantageously provided by the attachment of a separate hinge plate 37 to the respective parts 24 and the end 38 of the L-plate 22, as by riveting or welding the parts together. The sections 12 and 21 of the end frame are operatively continuous, forming a substantially unitary end piece, braced by the steel plate 8 at each end. For this reason the two end sections 12 and back rest 6 will move as a single part to raised or reclining position.

The angle irons 7 and 22 are relied upon to very securely hold the end sections 12 rigidly to the back rest 6, and will thus secure them whether in the lower position shown in Fig. 2 where the end sections 12 have swung backward upon the pivots 14, which has resulted in the lower edge 39 moving forwardly and upwardly in such view. When the rest and ends have swung into the vertical position, the said edge 39 swings downward and rearwardly to a position substantially in the same plane as the rear edge of the seat bottom 9, and I have therefore provided an elongated metal plate 40 somewhat wider than the thickness of the part 9, and secured the same to the edge of the latter by fasteners 41, as shown in Fig. 4, the upper edge 42 of said plate 40 serving as a stop against which the edge 39 may rest, and thereby holding the latch part 24, together with the edge 39, positively between the edge 42 and the flange 27.

The structure of the various parts of the adjustable vehicle seat which I have here described, results in a very serviceable seat or reclining support which is positively held in either position desired. Not only are the latch parts 24, 26, 27, 28 and 22 positive in action, and readily mounted upon the seat, ends and back, but since the forward end sections 21 are always stationary, the movement of the lower end of the section 12 of the ends will be closely adjacent the rear edge of the section 21 in all positions, because of the very high position of the pivots 14. The provision of the metal plates 8 further makes this assemblage of parts especially feasible.

Having thus described my invention, what I desire to secure by Letters Patent of the United States is,—

1. An adjustable vehicle seat having each seat end positioned in a vertical plane and divided to form a forward and a rear section, a back rest rigidly secured to each rear section, a seat bottom, including vertical supports upon which the rear sections are pivoted to permit the latter and the back rest to swing into a reclined position.

2. An adjustable vehicle seat having each seat end positioned in a vertical plane and divided to form a forward and a rear section, a back rest rigidly attached to each rear section, a seat bottom, support means carried by the seat bottom and including vertical plates having horizontal pivots upon which the rear sections may swing, a latch plate pivoted upon the lower edge of the back rest and extending forward over the upper surface of the seat bottom, a plate fixed to said bottom and having an up-turned flange to receive the thrust of the end of said latch plate, and lever means swinging on said forward section and having an inwardly extending toe piece positioned above the flange plate but beneath said end of the latch plate, for lifting the said plate end to release the latch.

3. An adjustable seat having raised ends, a seat bottom, and a back rest, each end being divided into forward and rear sections, a metal plate outside each raised end and secured to the seat bottom, the forward section being stationary and each rear section attached to the back rest which with the two rear sections swing as a unit upon horizontal pivots provided in said metal plates, to position the back rest alternatively in vertical or inclined plane, and a latch plate hinged to the said back rest and cooperating with a stationary flanged plate on the seat bottom to hold the back rest in vertical position and means for releasing the latch plate from said flanged plate to allow the back rest to swing backward on said pivots.

4. An adjustable vehicle seat having a rigid seat bottom raised seat ends each vertically divided into a forward and a rearward section and a back rest rigidly attached to the rear sections to swing together as a unit on horizontal pivots alternatively to vertical or reclining positions, a metal plate secured to each seat end and fixed to the seat bottom and having means thereon for pivoting the said rear sections, a latch plate pivoted upon the lower edge of the back rest and extending forward over the seat bottom and under the seat cushions, a flanged plate on said seat bottom to receive the thrust of the end of said latch plate, levers pivoted on said forward sections in vertical planes and provided with inturned toe extensions normally positioned beneath the ends of the latch plates whereby swinging of the lever releases the latch plate ends from the flanges, and metal plates secured to the forward edge of the seat bottom and extending rearwardly over the said flanges and latch plate ends, to protect the cushions from said flanges and latches.

5. An adjustable vehicle seat having each seat end positioned in a vertical plane and divided to form a forward and a rear section, a back rest rigidly secured to each rear section, a seat bottom, rigid means secured to the seat bottom and including vertical supports upon which the rear sections are pivoted to permit the latter and the back rest to swing into a reclined position, and a latch plate hinged to the said back rest and cooperating with a stationary flanged plate on the seat bottom to hold the back rest in vertical position and means for releasing the latch plate from the flanged plate to allow the back rest to swing backward on said pivots.

In witness whereof, I have hereunto set my hand and seal, this 15th day of May, A. D. 1930.

ALFRED R. HAUBER.